US009026667B1

(12) United States Patent
Joyce et al.

(10) Patent No.: US 9,026,667 B1
(45) Date of Patent: May 5, 2015

(54) TECHNIQUES FOR RESOURCE VALIDATION

(75) Inventors: Scott E. Joyce, Foxboro, MA (US); Gregory W. Lazar, Upton, MA (US); Donald Labaj, Northborough, MA (US)

(73) Assignee: EMC Corporation, Hopkinton, MA (US)

( * ) Notice: Subject to any disclaimer, the term of this patent is extended or adjusted under 35 U.S.C. 154(b) by 292 days.

(21) Appl. No.: 13/429,919

(22) Filed: Mar. 26, 2012

(51) Int. Cl.
*G06F 15/173* (2006.01)
*G06F 11/00* (2006.01)
*H04L 29/06* (2006.01)

(52) U.S. Cl.
CPC .............................. *H04L 29/06857* (2013.01)

(58) Field of Classification Search
CPC .................... G06F 17/30887; G06F 17/30896; G06F 17/30876; H04L 63/1483; H04L 12/585; H04L 63/1466
See application file for complete search history.

(56) References Cited

U.S. PATENT DOCUMENTS

| | | | | |
|---|---|---|---|---|
| 8,505,094 B1* | 8/2013 | Xuewen et al. | | 726/22 |
| 8,615,809 B2* | 12/2013 | Bajaj et al. | | 726/30 |
| 2005/0114469 A1* | 5/2005 | Nakamura et al. | | 709/218 |
| 2006/0294199 A1* | 12/2006 | Bertholf | | 709/217 |
| 2007/0162448 A1* | 7/2007 | Jain et al. | | 707/7 |
| 2008/0115047 A1* | 5/2008 | Petri | | 715/205 |
| 2009/0119769 A1* | 5/2009 | Ross et al. | | 726/13 |

OTHER PUBLICATIONS

WDG Web Authoring FAQ: HTML Frames; http://www.htmlhelp.com/faq/html/frames.html, Mar. 10, 2012, pp. 1-9.
w3schools.com; http/www.w3schools.com/jsref/obj_location.asp, Mar. 11, 2012; 2 Pages.

* cited by examiner

*Primary Examiner* — Joshua Joo
*Assistant Examiner* — Younes Naji
(74) *Attorney, Agent, or Firm* — Muirhead and Saturnelli, LLC

(57) ABSTRACT

Described are techniques for validating a resource. A hierarchy of objects is received. The hierarchy includes first and second objects at, respectively, first and second levels of the hierarchy. The second object is a child of the first object. The first object is a parent of the second object and represents a first resource embedding a second resource represented by the second object. Each of the objects in the hierarchy identifies a resource that is automatically retrieved in connection with rendering a webpage. A first server location providing the first resource is determined using the first object. A second server location providing the second resource is determined using the second object. In accordance with trusted location criteria, it is determined whether the first resource is allowed to embed the second resource.

19 Claims, 7 Drawing Sheets

TECHNIQUES FOR RESOURCE VALIDATION

BACKGROUND

1. Technical Field

This application generally relates resource validation and more particularly for validating that a resource is being referenced by a trusted or allowable location.

2. Description of Related Art

A web browser or browser, such as Internet Explorer™ by Microsoft Corporation, may be used to retrieve, process, and present resources. The resources may be web pages such as HTML (hyper text markup language) documents, as well images, videos, as other content. A resource that is a web page may be written in a language such as HTML whereby HTML may be characterized as a tag-based language. The browser does not display the HTML tags but rather uses the tags to interpret the contents of the page. The browser reads and interprets the HTML documents and composes or renders them into visible or audible web pages. In other words, the browser does not display the HTML tags, but uses the tags to interpret the content of the page. An HTML document may reference various resources which may be retrieved in connection with rendering the document for display as a webpage. The resources retrieved in connection with rendering the webpage may be identified using URLs (uniform resource locators) referenced within the HTML document. Thus, a first HTML document may reference a second HTML document, or more generally any second resource, to be retrieved in connection with rendering the first HTML document within the browser.

SUMMARY OF THE INVENTION

In accordance with one aspect of the invention is a method of validating a resource comprising: receiving a hierarchy of objects, said hierarchy including a first object at a first level and a second object at a second level, said first object being a parent of said second object and said second object being a child of the first object, said first object representing a first resource embedding a second resource represented by said second object, each of said objects in the hierarchy identifying a resource that is automatically retrieved in connection with rendering a webpage; determining, using the first object, a first server location providing said first resource; determining, using the second object, a second server location providing said second resource; and determining, in accordance with trusted location criteria, whether said first resource is allowed to embed said second resource thereby causing said second resource to be automatically retrieved in connection with processing said first resource when rendering said webpage, wherein said determining whether the first resource is allowed to embed said second resource uses said first server location and said second server location. The first server location may include a first fully qualified host name that is either a fully qualified domain name or a first numeric internet address for said first server location, and wherein the second server location my include a second fully qualified host name that is either a second fully qualified domain name or a second numeric internet address for said second server location. The first server location may include a fully qualified domain name that includes a first domain name and first domain host identified in said first object. The second server location may include a fully qualified domain name that includes a second domain name and second domain host identified in said second object. Each of the objects included in the hierarchy may be a document object including a location object. The location object may include a plurality of properties where a first of said properties includes a host name identifying a domain host and a domain name identifying an internet domain providing a resource represented by said each object. The first object may include a first instance of said first property identifying a first host name as said first server location and the second object may include a second instance of said first property identifying a second host name as said second server location. Determining whether the first resource is allowed to embed said second resource may include comparing at least a portion of said first server location to at least a corresponding portion of said second server location. The first server location may include a first fully qualified domain name and said second server location may include a second fully qualified domain name. Determining whether said first resource is allowed to embed said second resource may further include comparing said first fully qualified domain name to said second fully qualified domain name, and determining, based on said comparing, whether at least a portion of said first fully qualified domain name matches at least a corresponding portion of said second fully qualified domain name. The trusted location criteria may specify that said first resource is allowed to embed said second resource if said comparing determines that at least a portion of said first fully qualified domain name matches at least a corresponding portion of said second fully qualified domain name. The trusted location criteria may specify that said first resource is allowed to embed said second resource if said comparing determines that said first fully qualified domain name exactly matches said second fully qualified domain name. The first object may include a property identifying a first port from which the first resource represented by said first object is provided. The second object may include a property identifying a second port from which the second resource represented by said second object is provided. The trusted location criteria may specify that said first resource is allowed to embed said second resource if said first port is the same as the second port. The first object may include a property identifying a first protocol used in connection with providing the first resource. The trusted location criteria may specify that said first resource is allowed to embed said second resource if said first protocol is a predetermined secure protocol that performs verification processing including processing to verify an identity of the first server location. The first resource may be a first document and the second resource may be a second document identifying first instructions for performing said determining a first server location, said determining a second server location, and said determining whether said first resource is allowed to embed said second resource using said hierarchy of objects. The second resource may be a second document further embedding any of an application, an image, a document including instructions which are executed, a document including a script, an object including executable code, a multimedia document, a document including at least one of audio data, image data, video data, graphics data and text from the second server location. If the first instructions determine that the first resource is not allowed to embed the second resource, the first instructions may include instructions for alerting a user of a web browser and assigning the second object as a root of the hierarchy. The first object may not be a root of the hierarchy and may be included in a path from the root of the hierarchy to the second node, and the method may include examining one or more objects which are included in the path and which are ancestors of the first object, and determining whether each of one or more server locations identified by said one or more objects is a trusted location in accordance with said trusted location criteria. The first instructions may be included inline in said second document. The first instructions may be included in another resource that is automatically retrieved, loaded and/or processed in connection with processing said second document when rendering said webpage in a window.

In accordance with another aspect of the invention is a computer readable medium comprising code stored thereon for validating a resource, wherein said code, when executed, performs processing comprising: receiving a hierarchy of objects, said hierarchy including a first object at a first level and a second object at a second level, said first object being a parent of said second object and said second object being a child of the first object, said first object representing a first resource embedding a second resource represented by said second object, each of said objects in the hierarchy identifying a resource that is automatically retrieved in connection with rendering a webpage; determining, using the first object, a first server location providing said first resource; determining, using the second object, a second server location providing said second resource; and determining, in accordance with trusted location criteria, whether said first resource is allowed to embed said second resource thereby causing said second resource to be automatically retrieved in connection with processing said first resource when rendering said webpage, wherein said determining whether the first resource is allowed to embed said second resource uses said first server location and said second server location. The first server location may include a first fully qualified host name that is either a fully qualified domain name or a first numeric internet address for said first server location. The second server location may include a second fully qualified host name that is either a second fully qualified domain name or a second numeric internet address for said second server location.

In accordance with another aspect of the invention is a system comprising: a processor that executes code performing first processing for validating a resource; and a memory comprising code stored therein which, when executed, performs said first processing including: receiving a hierarchy of objects, said hierarchy including a first object at a first level and a second object at a second level, said first object being ancestor of said second object and said second object being a descendant of the first object, said first object representing a first resource that embeds, directly or indirectly, a second resource represented by said second object, each of said objects in said hierarchy identifying a resource that is automatically retrieved by a web browser when rendering a webpage; determining, using the first object, a first server location providing said first resource; determining, using the second object, a second server location providing said second resource; and determining, in accordance with trusted location criteria, whether said first resource is allowed to embed said second resource thereby causing said second resource to be automatically retrieved in connection with processing said first resource when rendering said webpage, wherein said determining whether the first resource is allowed to embed said second resource uses said first server location and said second server location.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
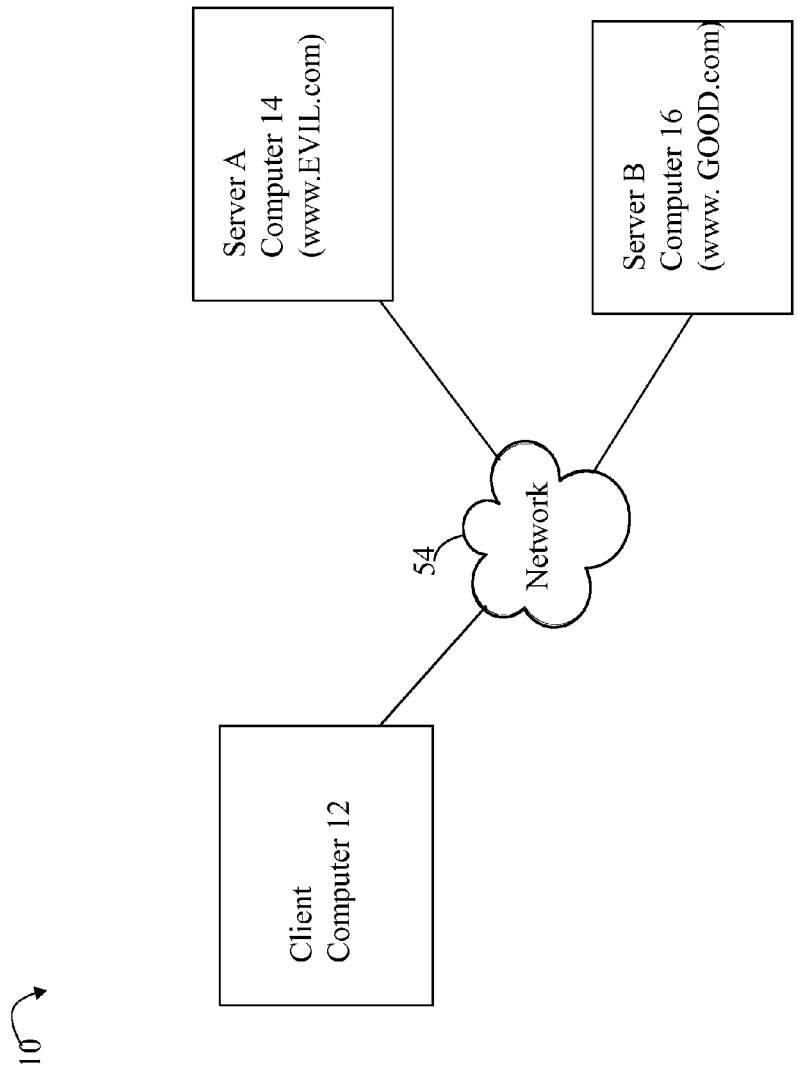
FIG. 1 is an example of an embodiment of a system that may utilize the techniques described herein.

Referring to FIG. 1, illustrated is an example of a suitable computing environment in which embodiments utilizing the techniques described herein may be implemented. The computing environment illustrated in FIG. 1 is only one example of a suitable computing environment and is not intended to suggest any limitation as to the scope of use or functionality of the techniques described herein. Those skilled in the art will appreciate that the techniques described herein may be suitable for use with other general purpose and specialized purpose computing environments and configurations. Examples of well known computing systems, environments, and/or configurations include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The techniques set forth herein may be described in the general context of computer-executable instructions, such as program modules, executed by one or more computers or other devices. Generally, program modules include routines, programs, objects, components, data structures, and the like, that perform particular tasks or implement particular abstract data types. Typically the functionality of the program modules may be combined or distributed as desired in various embodiments.

Included in FIG. 1 are a client computer 12, a network 54, and two servers, server A computer 14 and server B computer 16. The computers using in connection with 12, 14 and 16 may each include a standard, commercially-available computer or a special-purpose computer that may be used to execute one or more program modules. Described in more detail in following paragraphs and figures are program modules that may be executed by the computer 12 in connection with using the techniques described herein. The computer 12 may operate in a networked environment and communicate with other computers, such as a servers 14 and/or 16, as well as others not shown in FIG. 1.

It will be appreciated by those skilled in the art that although the computer 12 is shown in the example as communicating in a networked environment, the computer 12 may communicate with other components utilizing different communication mediums. For example, the computer 12 may communicate with one or more components utilizing a network connection, and/or other type of link known in the art including, but not limited to, the internet, an intranet, or other wireless and/or hardwired connection(s).

In connection with exemplary embodiments described herein, the network 54 may be the internet. Each of the computers 12, 14 and 16 may have an associated internet address or IP (internet protocol) address (e.g., 192,168.5.7). Each of the computers 12, 14 and 16 may also have an associated host or server name denoting a name of a host within a particular internet domain. For example, server computer 14 may have a server or host name of "www.EVIL.com" whereby "www" denotes the host or server included in the domain "EVIL.com". Server computer 16 may have a server or host name of "www.GOOD.com" whereby "www" denotes the host or server included in the domain "GOOD.com". As known in the art and also described elsewhere herein, each such host or server name, such a "www.GOOD.com" may be referred to as a fully qualified domain name (FQDN) that may be translated to a corresponding numeric IP address through use of a domain name resolution process by DNS servers or domain name servers. Such a translation may be performed in connection with requests for resources, such as may be issued from the client computer 12 for resources located at servers 14, 16. Examples of such requests that may be made from the client computer 12 as in connection with rendering a webpage for display in a window are described in more detail in following paragraphs.

Figure 2:
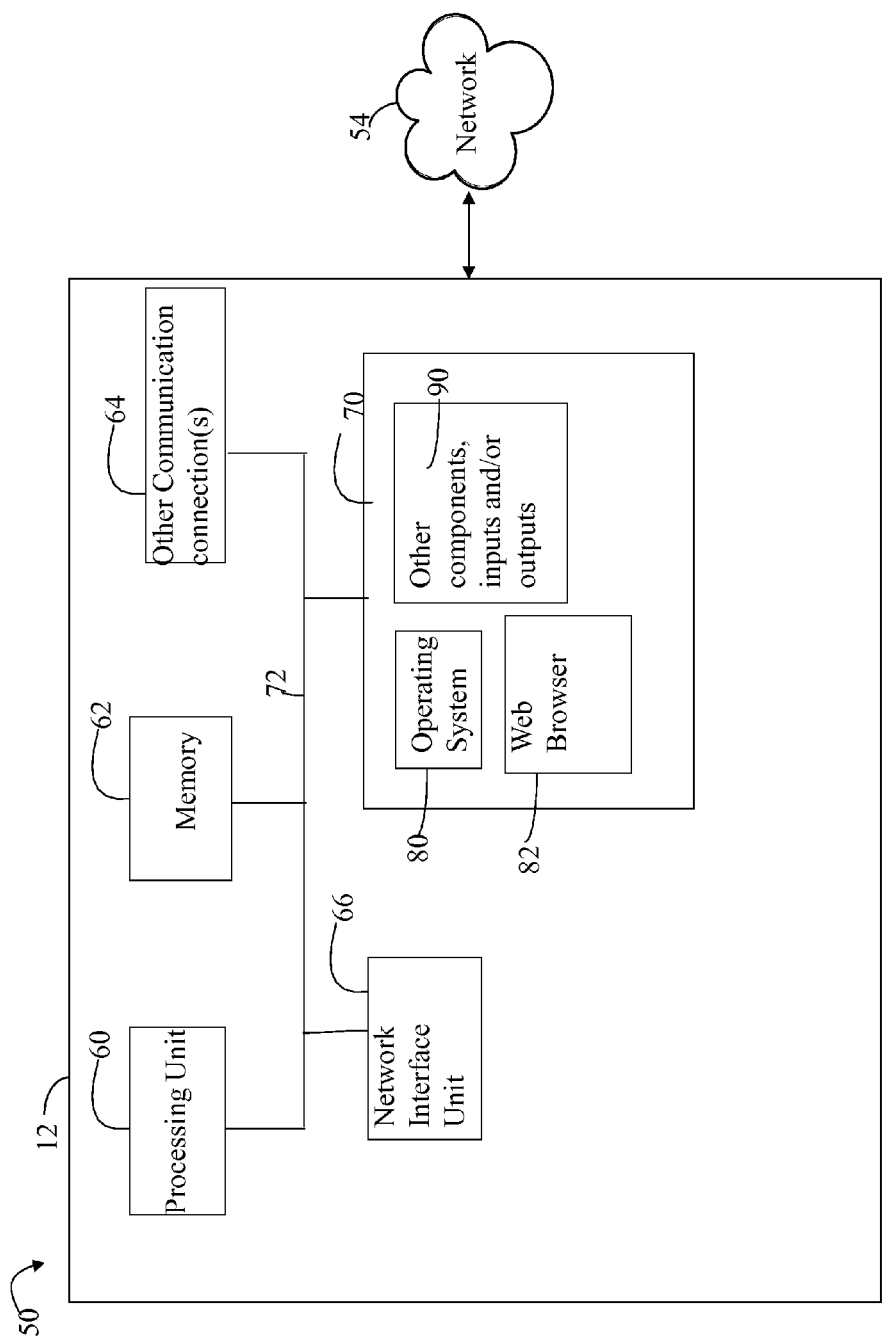
FIG. 2 is an example illustrating components that may be included in a client in an embodiment in accordance with techniques herein.

Referring to FIG. 2, shown is an example of components that may be included in the client computer 12 as may be used in connection with performing the various embodiments of the techniques described herein. The computer 12 may include one or more processing units 60, memory 62, a network interface unit 66, storage 70, one or more other communication connections 64, and a system bus 72 used to facilitate communications between the components of the computer 12.

Depending on the configuration and type of computer 12, memory 62 may be volatile (such as RAM), non-volatile (such as ROM, flash memory, etc.) or some combination of the two. The computer 12 may also include additional storage (removable and/or non-removable) 70 including, but not limited to, USB devices, magnetic or optical disks, or tape. The storage 70 may include one or more different types of computer-readable media that can be accessed by the computer 12 such as, for example, a hard disk or CD-ROM drive, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by computer 12. Stored on the computer readable media may be computer readable instructions, data structures, program modules and/or other data as may be used in connection with the techniques herein.

The computer 12 may also contain communications connection(s) 64 that allow the computer to communicate with other devices and components such as, by way of example, input devices and output devices. The computer 12 may operate in a networked environment and may connect to the network 54 of FIG. 1 through a network interface unit 66 connected to bus 72.

One or more program modules and/or data files may be included in storage 70. During operation of the computer 12, one or more of these elements included in the storage 70 may also reside in a portion of memory 62, such as, for example, RAM for controlling the operation of the computer 12. The example of FIG. 1 illustrates various components of the computer 12 including an operating system 80, a web browser 82, and other components, inputs, and/or outputs 90. The operating system 80 may be any one of a variety of commercially available or proprietary operating systems. The operating system 80, for example, may be loaded into memory in connection with controlling operation of the computer. The web browser 82 may be used in connection with techniques described herein for requesting one or more resources, such as documents including various types of content for processing and/or display by the web browser 82.

Each of the servers 14, 16 may include suitable hardware and/or software similar to that as illustrated in FIG. 2 with the difference, for example, that each of 14, 16 may not include client applications and modules such as 82 but may rather include other server-based modules and components such as may be used to provide resources, services, content, and the like, in connection with each particular server.

As known in the art, the web browser 82 of the client 12 may perform processing to display or render a web page. Generally, the web browser or browser may be characterized as a software application for retrieving, presenting, interpreting, traversing and/or processing information resources such as may be obtained from one or more internet locations or websites (e.g., servers or hosts have an IP address). Examples of web browsers include, for example, Internet Explorer™ by Microsoft Corporation, Firefox, and the like. The web page processed by the web browser may be a document or file, or more generally a resource, such as an HTML (hyper text markup language) file written in accordance with the HTML language that may include tags. Within a first HTML file that is a first resource, there may be references to one or more other resources which are further loaded, retrieved or otherwise processed in connection with rendering or processing the first HTML file for display as a webpage within a window. Each such resource in the first HTML file may be further characterized as embedded, incorporated, included, or otherwise referenced and then retrieved or loaded in connection with rendering or processing the first HTML file. Such resources in the first HTML file which are automatically processed when rendering the first HTML file as a webpage within a window may be located on the same or different server than the first HTML file. The first HTML file may identify such resources using URLs (uniform resource locators) specified in the first HTML file. The resource identified by a URL embedded in the first HTML file may be for a second HTML file or document, an image, a video, a multimedia file, an application (e.g., a resource including executable code or instructions), a script (e.g., containing instructions), or more generally, any allowable information or content that may be processed for use with the web browser in connection with rendering a web page. Each URL included in the first HTML file may denote a resource which the web browser automatically requests from the identified location in the URL when processing the first HTML file for display as a webpage in a window. URLs are described in more detail elsewhere herein. As also known in the art, an HTML file such as processed by the browser may also include instructions in the form of a scripting language, such as JavaScript™.

Figure 3:
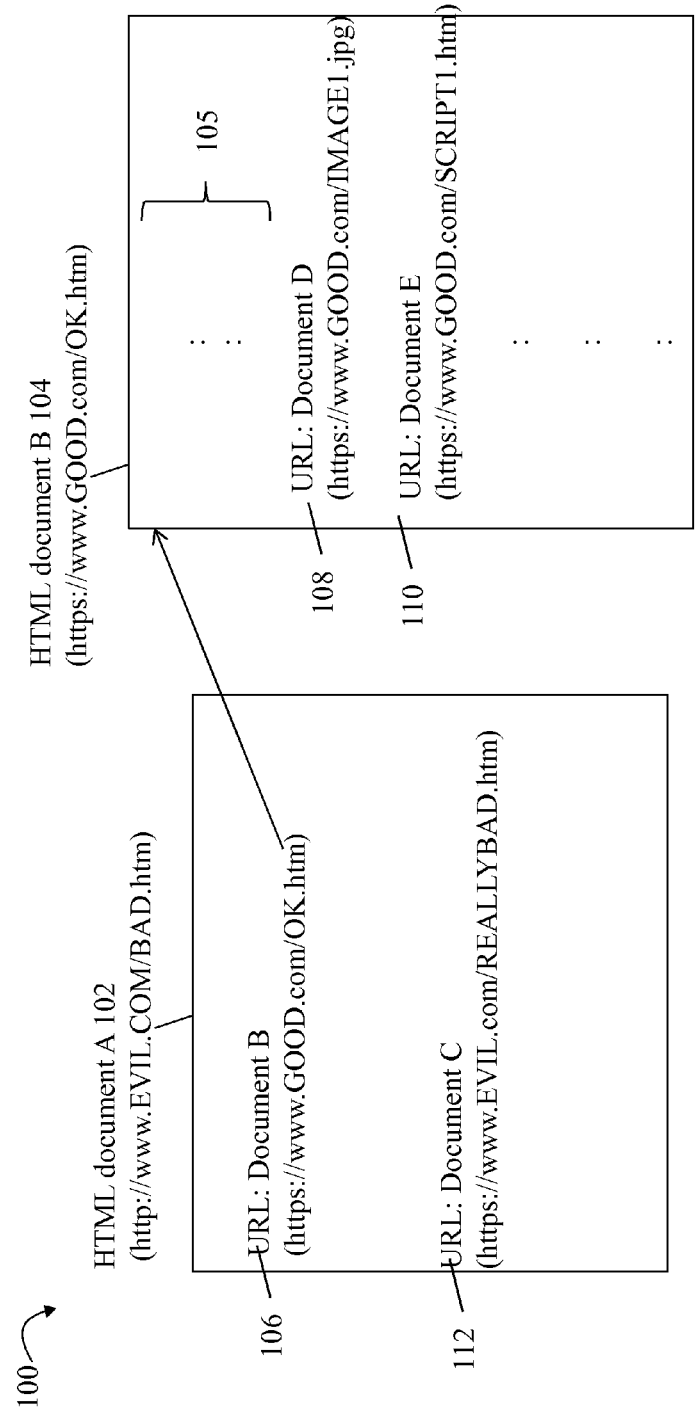
FIG. 3 is an example of resources that may be used in an embodiment in accordance with techniques herein.

Referring to FIG. 3, shown is an example of resources that may be used in an embodiment in connection with techniques herein. The example 100 includes an HTML document A 102 that may be requested by the client 12 from server A computer 14 having an associated internet location or web address denoted by "www.EVIL.com". Document A 102 may have a URL (uniform resource locator) of http://www.EVIL.COM/BAD.htm. Document A 102 may further embed or reference for automatic retrieval or loading other resources therein when processing document A 102 for rendering as a webpage in a window. For example, document A 102 may include a first URL 106 embedding or referencing a second HTML document B 104 that is automatically retrieved in connection with rendering document A 102 for display in window whereby document B 104 may also be provided by another server, host or website at server B computer 16. Server B computer 16 may have an associated internet location or web address denoted by "www.GOOD.com". Document A 102 may also include a second URL 112 embedding or referencing a third HTML document C whereby the document C is automatically retrieved or loaded when processing document A 102 for display as a webpage. The URL 112 for document C may be https://www.EVIL.com/REALLYBAD.htm indicating that document C is also provided by server A computer 14, www.EVIL.com. Although additional detail is not illustrated for document C, for purposes of this example it is assumed that document C contains no other references to other embedded resources which are loaded or retrieved when processing document C for display within a webpage being rendered. Document C may be an HTML document containing, for example, a script with instructions written in JavaScript.

The server or host website "www.GOOD.com" (e.g. 16 of FIG. 1) may not want its documents (or more generally resources or content) embedded within another resource provided by a different server or host, such as www.EVIL.com (e.g., 14 of FIG. 1). In other words, the server of host website "www.GOOD.com" may not want its resources included in another resource (such as document A 102) whereby such resources of www.GOOD.com would be automatically retrieved and processed in connection with rendering the other resource (e.g., document A 102). In connection with techniques herein, validation processing may be performed to detect such undesired embedding or inclusion of the resources provided by "www.GOOD.com" in another document or resource of a different server or host, such as "www.EVIL.com". In connection with techniques herein, such validation processing may be performed to determine whether the above-mentioned different server or host (e.g. www.EVIL.com) providing a first resource (e.g., document A 102) that embeds another second resource therein (e.g., document B 104) provided by "www.GOOD.com" is a trusted server or host (e.g., a trusted location) of "www.GOOD.com". Such validation processing to determine whether the first resource is allowed to embed the second resource includes determining whether the server providing the first resource is trusted by the server providing the second resource. Generally, an embodiment may specify trusted location criteria that defines or denotes conditions for determining whether the server providing the first resource is trusted by the server providing the second resource. For example, in connection with one exemplary embodiment, "www.GOOD.com" may not want any other server, host or website to provide a document which embeds its content. With reference to FIG. 3, "www.GOOD.com" may not want any other server, host or website other than "www.GOOD.com" to embed any of its content (e.g. document B 104, 106, IMAGE1 108 and SCRIPT 110). In such cases, the validation processing may be performed, such as by code or instructions included in the document B 104, to detect when the document B 104 is being embedded within another document provided by a different server, host or website. In response to detecting such a condition, the code or instructions of document B 104 may perform any desired action. As described in more detail elsewhere herein, processing may be performed to obtain information included in a document object hierarchy where such information denotes the server or host providing document B and any server or host providing another document, such as document A, which references document B. Trusted location criteria may be defined which specifies rules or conditions of when a server or host providing the other document A (which references document B) is considered a trusted server or host. For example, in a first exemplary embodiment in accordance with techniques herein, the trusted location criteria may specify that document B provided by "www.GOOD.com" is only allowed to be embedded within other documents provided by the same server or host "www.GOOD.com". The trusted location criteria may be configurable, such as based on desired policies.

Figure 4:
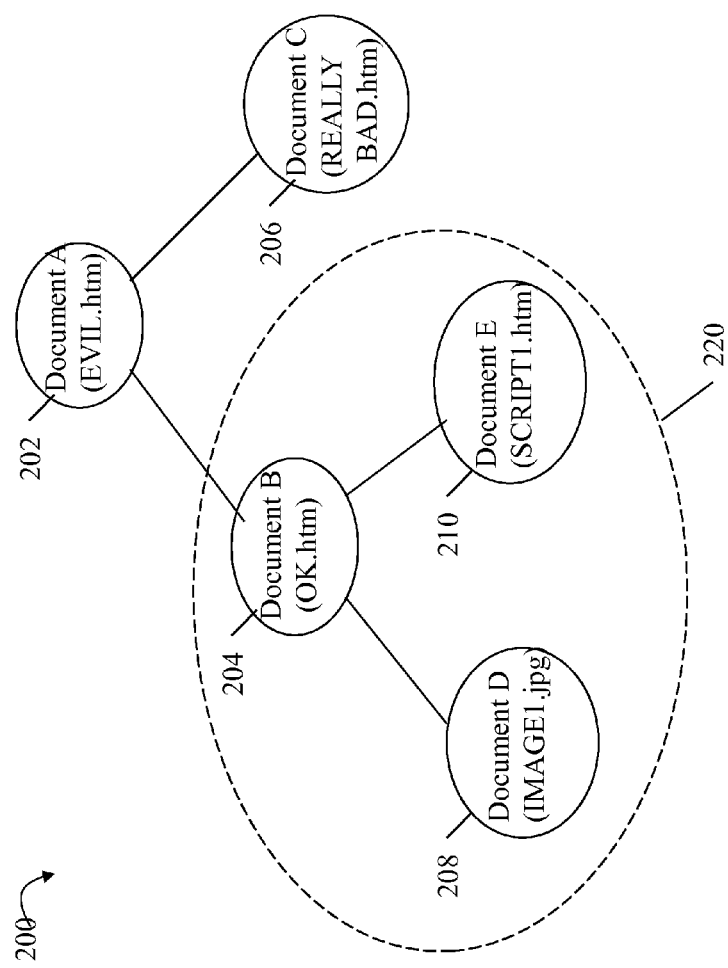
FIG. 4 is an example of a document object hierarchy as may be used in an embodiment in accordance with techniques herein.

Referring to FIG. 4, shown is an example of a document object hierarchy as may be created in connection with the example illustrated in FIG. 3. In the example 200, a document object may be created for each document, or more generally each resource, that is referenced (e.g., loaded, retrieved, interpreted and/or otherwise processed) by a client web browser in connection with the example illustrated in FIG. 3. The hierarchy of document objects may form a tree of levels of the hierarchy. Each document object may be represented as a node in the tree. The hierarchy 200 includes node 202 as the root at level 1 in the tree or hierarchy, node 204, 206 at level 2 in the hierarchy, and nodes 208, 210 at level 2 in the hierarchy. Each node at a level in the hierarchy may represent information of a document, or more generally a resource. If that resource is represented by a first document object in the hierarchy, and that resource further embeds (e.g., causes retrieval or loading of) any other resources (e.g., such as an HTML file that includes or embeds one or more other HTML files, applications, images, and/or other content), each such other resource may be represented as a child document object of above-mentioned first document object. The hierarchical tree includes a root node 202 corresponding to the original or first document (e.g., document A 102) as requested by the client. Children of the root node 202 are node 204, 206 which represent documents or resources embedded within document A 102 (whereby child documents represented by the child nodes 204, 206 are referenced within the parent document represented by node 202 and such child documents are retrieved or loaded in connection with rendering the parent document for display in a webpage). For example with reference back to FIG. 3, the HTML document A 102 references therein a first document B 106 and a second document C 112 whereby such documents B 106 and C 112 are automatically loaded or retrieved in connection with processing document A 102 for display in a webpage. As illustrated in the example 200, the document objects 204, 206 represent, respectively, document B 106 and document C 112 embedded within document A 102. Similarly, nodes 208, 210 are child nodes of node 204 whereby nodes 208, 210 represent documents or resources embedded within the document B represented by document object 204. Since resources represented by document objects 208, 210, and 206 do not further include or embed any other resources, objects 208, 210, and 206 may be referred to as leaf nodes or objects in the illustrated hierarchy. A path from the root node 202 to a particular node in the hierarchy represents the traversal of the browser through various resources and associated links or embedded levels to automatically obtain the resource represented by the particular node in connection with rendering for display the document represented by the root node 202. For example, the path denoted by 202, 204, 208 denotes the resources traversed by the browser to retrieve the document represented by object 208 (e.g., beginning with the original document and associated object 202) in connection with rendering the document represented by the root node 202.

Generally, a node at a level N+1 in the hierarchy of 200 represents an additional document embedded within a document represented by its parent node at level N. Element 220 denotes those nodes which are document objects representing resources or documents of the website or server "www. GOOD.com" (e.g., 16 of FIG. 1). Elements 202, 206 denote those nodes which are document objects representing resources or document of the website or server "www.EVIL.com" (e.g., 14 of FIG. 1). When the web browser retrieves a new resource in connection with rendering a webpage for display in a window, a new object may be created in the hierarchy illustrated in FIG. 4. If that new object has any embedded resources, such as by links to other resources via URLs, the additional objects in the tree are created one for each such resource.

In one embodiment, the objects included in the hierarchy 200 may be in accordance with an object model such as the document object model (DOM) known in the art. More generally, the objects and model used in connection with techniques herein may be any suitable object model supported for use with the web browser or other application processing a resource in connection with techniques herein.

The hierarchy 200 may be created as each resource associated with a document object is retrieved by the web browser when rendering an original resource denoted by the root node 202 of the hierarchy. Thus at any point in time, a portion of the hierarchy may be created and exist depending on the point at which the web browser is in connection with automatically retrieving requested resources when rendering a webpage including the original resource. The hierarchy 200 may represent the hierarchy at a point in time after the browser has retrieved all the requested resources in connection with the rendering a webpage as in the example of FIG. 3.

However, as described elsewhere herein, the server or host "www.GOOD.com" providing document B 104 may not want document B 104 (or any of its resources) embedded within any other resource provided by a different server or host, such as "www.EVIL.com". To detect this undesired embedding, techniques herein may be performed by code or instructions, such as a JavaScript instructions, included in the document B 104. As will be described herein, such instructions may be executed by the browser to examine object information included in one or more objects of the hierarchy 200. For each resource having an associated object in the hierarchy, the associated object may include various attributes or properties regarding the URL for the resource including properties identifying aspects of the server or host providing the resource. As such, an embodiment in accordance with techniques herein may use such object information to detect when a first resource having a first node in the hierarchy has a parent node in the hierarchy representing a second resource embedding the first resource. Information of the parent node/object in the hierarchy may be examined to determine whether such information indicates that the second resource is provided by the same server or host a the first resource. One embodiment may make such a determination by comparing information identifying the respective providing servers or hosts as included in the first node or object (providing the first resource) and the parent node or object providing the second resource.

In connection with the example of FIG. 3, such instructions may be included as JavaScript instructions in portion 105 of document B 104 which are executed prior to any other HTML statements (e.g., prior to downloading any other documents or content from the server 16 that may be further embedded in document B 104). In connection with performing such a check at this point in document B at runtime while the browser is retrieving resources referenced in document A 102, the hierarchy 200 may not include all nodes as illustrated in FIG. 4. Rather, at this point, only nodes 202 and 204 may exist in the hierarchy when these instructions of 105 in accordance with techniques herein are executed and use the information of document objects 202, 204 to detect this undesirable embedding of document B 104 within document A 102. It should be noted that including scripts or instructions inline within document B is only one way in which the techniques herein may be embodied. It will be appreciated by those skilled in the art that, more generally, any suitable means may be used to embody the processing performed in connection with techniques herein such as, for example, in executable code of an application, using different languages, referencing another script from within document B including the instructions to be executed embodying the logic and processing described herein, and the like.

To further describe the information of the object(s) in the hierarchy utilized and the processing performed using such information with the techniques herein, following paragraphs set forth additional detail regarding the document objects in the hierarchy 200 and relationship of such information to a URL of each identified resource having a document object in the hierarchy.

Figure 5:
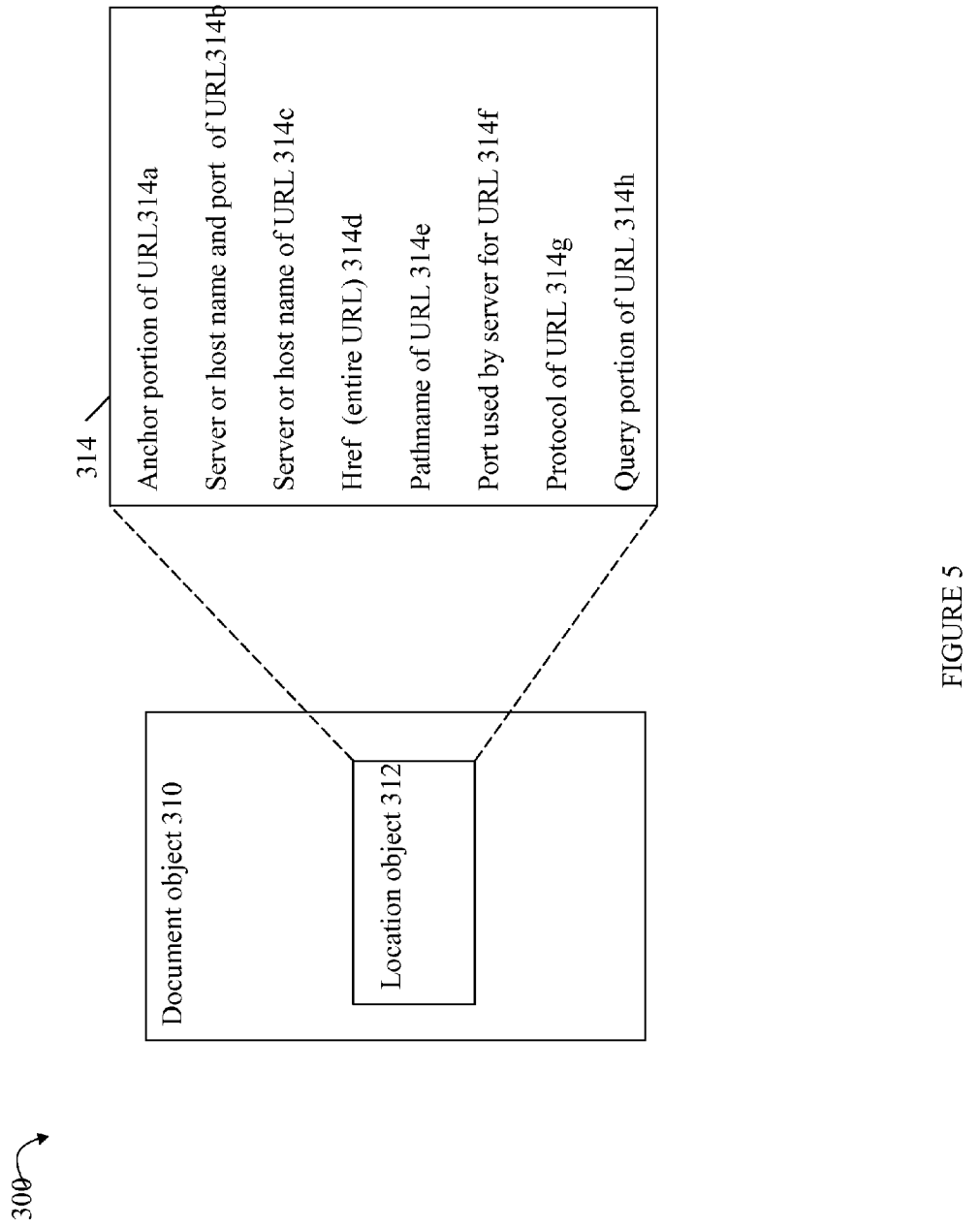
FIG. 5 is an example providing additional detail regarding a location object as may be included in a document object in an embodiment in accordance with techniques herein.

Referring to FIG. 5, shown is an example illustrating in more detail a document object that may be used in connection with techniques herein. The document object 310 of FIG. 5 may represent in more detail information regarding each node or object in the hierarchy 200 of FIG. 4. Each instance of a document object 310 may include a location object 312 as well as other information not described herein. Portions of the information in the location object 312 identifying the location of the resource via the URL may be used in connection with techniques herein. Element 314 illustrates various properties or attributes that may be included in the location object for a represented document or resource having a URL. Generally, each property of 314 may include all or some portion of the URL as described in more detail elsewhere herein. For a URL of a given resource or document represented by document object 310, its location object 314 may include the following properties: an anchor portion 314a of the resource URL, a server or host name and port of the URL 314b, the server or host name of the URL 314c (without the port), the entire URL as the Href property 314d, the pathname of the URL 314e, the port number of the URL 314f, the protocol of the URL 314g, and the query portion of the URL 314h.

Figure 6:
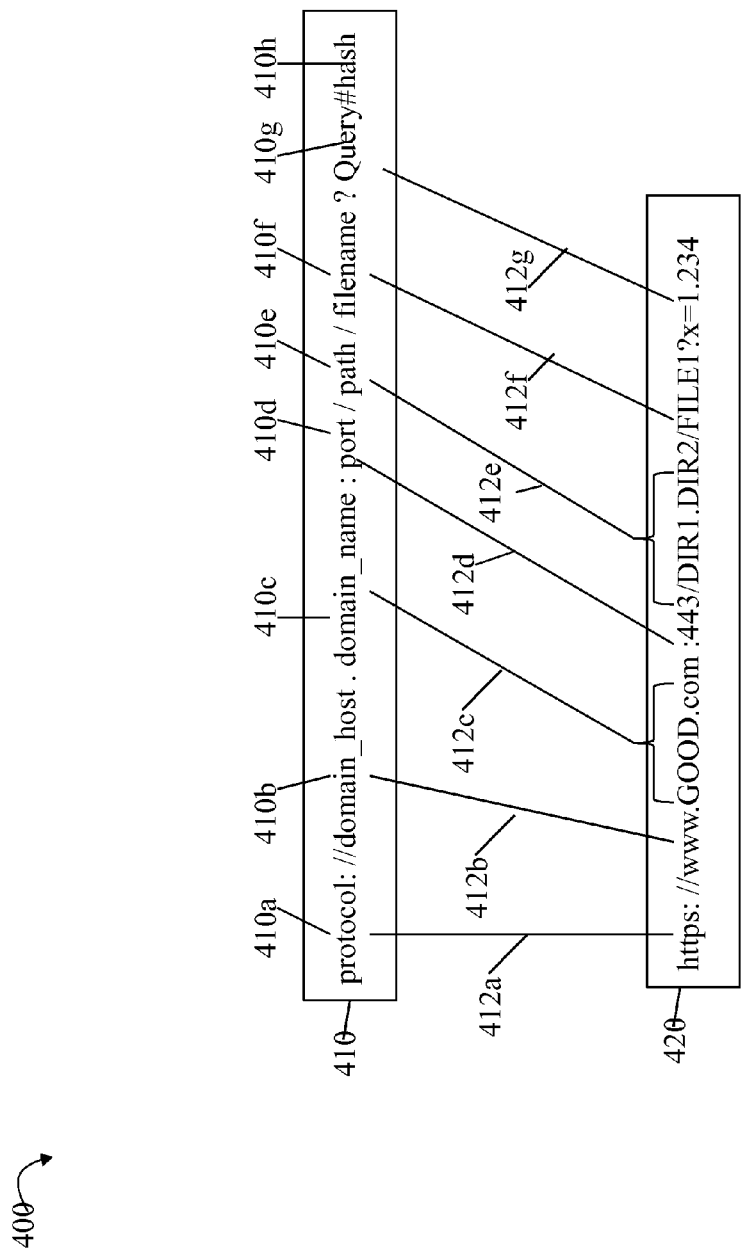
FIG. 6 is an example illustrating portions of a URL (uniform resource locator) as may be used to specify a location of a resource in an embodiment in accordance with techniques herein.

Referring to FIG. 6, shown is an example illustrating portions of a URL that may be used in connection with referencing a web address of a resource on the internet. In the example 400, element 410 represents the basic syntactic element comprising a URL and element 420 is an example of a URL as may be specified in retrieving a resource for use in connection with techniques herein. Referring to 410, a URL may specify a protocol 410a, domain_host 410b, domain_name 410c, port 410d, path 410e, filename 410f, query 410g and hash or anchor portion 410h. The protocol 410a specifies the scheme or communications protocol of the URL. As represented by 412a, https is an example of a protocol. Other examples include http, ftp, and the like, as may be used in connection with host or server communications when loading the resource identified by the URL. The domain_host 410b specifies the domain host or server located within the internet domain identified by the domain name 410c. As represented by 412b and 412c, the domain host or server is "www" located within the domain "GOOD.COM". In this example, ".com is the top-level domain (TLD). As known in the art, the TLD may be characterized as similar to the root directory.

Within the ".com" TLD is the "GOOD.com" domain. As known in the art, there may also be further defined subdomains with "GOOD.com" (e.g., "uk.GOOD.com" is an example of such a subdomain that may be defined). Examples of other TLDs include .net, .edu, .org, .tv, and other such as those denoting particular countries (e.g., .uk, .us, and the like).

The port 410d specifies the port number used by the server or host when providing the identified, resource. As represented by 412d, 443 is an example of a port number such as typically used in connection with the https protocol. As another example port 80 is typically used in connection with the http protocol.

The path 410e specifies a path at the server or host to the resource. If omitted, the document or more generally the resource is located at the root. As represented by 412e, "DIR1.DIR2" identifies a path in terms of a directory structure at which the resource is located.

The filename 410f specifies the name of the document or resource within the path. As represented by 412f, FILE1 is an example of a document or resource located in the directory "DIR1.DIR2" on the server.

The query 410g identifies the query portion of the URL such as may include parameters. As represented by 412g, "x=1.234" is an example of a query portion. Although not illustrated in 420, a URL may also include an anchor portion.

With reference to FIGS. 5 and 6, the protocol 410a of the URL may be specified as the location object property 314g. The domain_host 410b in combination with the domain_name 410c of the URL may be specified as the location object property 314c denoting the server or host name. The domain_host 410b in combination with the domain_name 410c and port 410d of the URL may be specified as the location object property 314b denoting the server or host name in combination with the port. The port 410d of the URL may be specified as the location object property 314f. The pathname 410e of the URL may be specified as the location object property 314e. The query 410g of the URL may be specified as the location object property 314h. The hash or anchor 410h of the URL may be specified as the location object property 314a. The entire URL 410, 420 may be specified as the location object property 314d.

In connection with techniques herein, an embodiment may use portions of the URL denoted by 410b and 410c (e.g., 314c and also included as a portion of information in 314b). Additionally, an embodiment in accordance with techniques herein may also use other portions of the URL such as denoted by 410a (e.g., 314g), 410d (e.g., as included in 314f, and as a portion of information of 314b). Alternatively, an embodiment may extract desired information from the property 314d such as by parsing.

With reference to FIG. 6, it should be noted that the combination of the information denoted by 410b, 410c may be referred to as the host or server name. In some instances, the combination of the information of 410b, 410c be also be a fully-qualified host or server name (FQHN). A FQHN means that the information of 410b, 410c specifies either the fully-qualified domain name (FQDN) of a host (i.e., a completely specified domain name ending in a top-level domain such as .com like www.GOOD.com), or the numeric Internet Protocol (IP) address of a host or server (e.g., 192.168.4.3). A FQHN may identify a server or host website providing a resource.

When a client is connecting to a host or server (e.g., such as using https for example), the client may specify the FQDN in the URL of the desired resource. As known in the art, the domain name server (DNS server) then resolves the host or server name to its IP address through a name resolution process using its DNS tables. However, it should be noted that there may be instances where the URL of the desired resource may not denote the FQDN. For example, only the domain_host 410b (without the domain_name information 410c) may be specified when connecting to the remote host or server. In this case, additional processing may be performed using techniques known in the art to resolve the domain_host 410b to its FQDN and its associated IP address (e.g., perform processing by the client to attempt to identify an appropriate domain name).

With reference again back to the example of FIG. 3, as mentioned above, element 105 may denote a location in document B which may include instructions in the form of a script included directly (or indirectly) in document B. In one embodiment, the logic embodied within these instructions when executed may perform processing to examine the property 314c denoting the server or host name of the URL for document object 202 representing document A 102, whereby document object 202 is the parent of object 204 (corresponding to document B 104). As noted above, property 314c of node 202 may be a FQDN for document A 102 which, in this example is "www.EVIL.com". This may be compared to the value of property 314c of node 204 identifying a FQDN for document B 104 which, in this example is "www.GOOD.com". In connection with this embodiment, the trusted location criteria may specify that the above-mentioned FQDNs of the parent node 202 and child node 204 must exactly match for the server or host of document A to be deemed or considered a trusted location. In this example, the trusted location criteria indicates that only the same host or server of document B may embed document B. Furthermore, such criteria indicates that the "same host or server" means that the FQDNs of the above-mentioned parent object/node and child object/node in the hierarchy match, where the child node denotes the resource embedded within another resource corresponding to the parent node/object. If such criteria is not met such as the comparison indicates that the above-mentioned FQDNs for the parent and child objects do not match, then the script or other code may perform any suitable desired action. Such actions may include, for example, alerting or notifying the client (e.g., displaying a message on a user interface), taking an action to remove the other document or resource from the hierarchy (e.g., such as by setting the child object/node to be the root of the document hierarchy), and the like.

Following is an example of a snippet of JavaScript that may be used in connection with the above-mentioned criteria whereby the criteria specifies that the parent and child nodes are to have matching property values for 314c (e.g., matching host or server names). In the following snippet, the "current document node" denotes the child node (such as node 204 for document B 104) and the parent node denotes the current document node's parent (e.g. node 202 which is the parent of node 204). In this manner, the below-referenced snippet represents instructions such as may be included in, or otherwise invoked from, document B at position 105 prior to performing any other processing for document B:

```
/**
Security.js
*
*/
var Security={
  /**
  *This function verifies that the parent document and the
     current document come from
  *the same server.
```

```
*/
checkParentURL: function( ){
    // Boolean to indicate if an error was found.
    var errorFound;
    // Try to retrive the parents location
    try{
        // Get the parent node's host or server name-property
            314c
        var parentServer=parent.location.hostname;
        // Get the current document node's host or server
            name-property 314c
        var currentServer=location.hostname;
        // If there is a match, then no error
        if (currentServer==parentServer){
            errorFound=false;
        }
        else
        //no match then error
        {
            errorFound=true;
        }
    } catch (error){
        // Unable to retrieve the parent's location due to it
            being in a different domain.
        errorFound=true;
    }
    if (errorFound=true){
        //Perform action to alert user and assign the current
            document as
        // the root of the document hierarchy.
        //
        // Alert to inform user of the issue.
        alert("Original URL to document is not from same
            origin as it's children."+
            "There could be possible security implications."+
            "Please verify that the original document is
                valid."+
            "You are being redirected to the correct location.");
        // Redirect to correct page.
        top.location=self.document.location;
    }
    return errorFound;
    }
}
```

As a variation to the foregoing, the criteria may further indicate that the port number of each such parent and child nodes also match. Thus, the trusted location criteria may indicate that the "same host or server" means that the FQDNs and port numbers of the above-mentioned parent object/node and child object/node in the hierarchy match, where the child node denotes the resource embedded within another resource corresponding to the parent node/object. In this case, processing may be performed to obtain and compare the property 314b from each of the parent object/node and child object/node. If the value of property 314b of child node 204 matches the value of property 314b of its parent node 202, then document B corresponding to node 204 is allowed to be embedded within the parent or referencing document A represented by node 202. As a variation, rather than require that the port numbers and server or host names of the parent and child nodes match, an embodiment may specify criteria whereby the server or host names of the parent and child nodes match and the port numbers of the child and parent nodes may be any one port number of a predetermined set of allowable port numbers.

As a variation to the foregoing, the criteria may indicate that either the above-mentioned FQDNs of the parent and child objects (e.g., property 314c in objects for documents A and B) must match or alternatively, an equivalent IP address for the FQDN may be specified in the URL (and may be included as an allowable matching value for property 314c). In this case, the embedding of document B within document A is allowable if: the property 314c in objects 202, 204 for documents A and B identify the same FQDN, the property 314c of both objects 202, 204 identify the same IP address, or the property 314c of one of the objects 202, 204 denotes a FQDN and the property 314c of the other of the object 202, 204 denotes an IP address corresponding to the FQDN.

As described herein, the FQDN may include a domain server or host (e.g., "www") and a domain name (e.g. "GOOD.com"). As also known in the art, the domain name may also specify a subdomain within the domain. For example "GOOD.COM" may have 50 subdomain, one for each state in the United States. In this case, a domain name including a subdomain for Massachusetts may be "MA.GOOD.com" and a subdomain for New York may be "NY.GOOD.COM". It may be desirable to allow embedding between any resources having a URL in the domain "GOOD.COM" or any of subdomain within "GOOD.com" such as "MA.GOOD.COM". For example, it may be desirable to allow a first HTML file provided from the host or server A having a web or internet address denoted by "serverA.MA.GOOD.COM" to embed any resource from another host or serverN having a web or internet address denoted by "serverB.NY.GOOD.COM", "www.GOOD.com", or any other server included in any subdomain of GOOD.com. In this case, the criteria may indicate that at least a portion of the FQDNs for the parent object/node and child object/node must match. For example, the criteria may indicate that at least the domain (e.g. GOOD) and TLD (e.g., .com) of the two FQDNs denoted by property 314c of nodes 202 and 204 must match in order for document B to be allowed to be embedded by document A. As a further variation, it may be desirable to allow predetermined variations in the TLD (e.g., .com, .net, .org) and subdomain (e.g., allow first document from MA.GOOD.COM to embed a document from NY.GOOD.COM) but require that the name of the domain (e.g. "GOOD") of the parent and child objects 202, 204 match. In this manner, the trusted location criteria may allow a first document having a URL denoting a host or server name of "serverA.MA.GOOD.COM" to embed a second document having a URL denoting a host or server name "serverB.NY.GOOD.net"

As yet a further variation, the trusted location criteria may also indicate that any parent object (denoting a first resource referencing or embedding a second resource represented as a child object of this parent) operate using a secure communications protocol when serving the first resource. In this case, the trusted location criteria may indicate that the value of property 314g of the parent object denote a secure communications protocol such as, for example, HTTPS (Hypertext Transfer Protocol Secure). As known in the art, HTTPS is a combination of Hypertext Transfer Protocol (HTTP) with the SSL (secure socket layer)/TLS (transport layer security) protocol. It provides encrypted communication and secure identification of a network web server. HTTPS signals the client browser to use an added encryption layer of SSL/TLS in connection with HTTP when communicating with a server such as to retrieve a requested resource over the internet from the server. In connection with HTTPS, processing may be performed which includes server authentication (e.g., such as by the client examining and validating/verifying the server's digital certificate and that the certificate correctly and properly identifies an expected trusted entity associated with the server's website or internet address). Thus, specifying that the server or host providing the first resource (e.g., corresponding to the parent object) use HTTPs is one way of ensuring that the above-mentioned validation or verification of the server's identify is performed.

In connection with the example of FIGS. 3 and 4 where document B 104 is embedded in document A 102, processing is described whereby only a single match or check is determined between a child object and its parent object. However, it may be the case that such comparisons or checks are made at other levels in the hierarchy and/or that more than one such check or comparison be performed to determine whether a resource is allowed to be embedded in another resource. For example, it may be that a first variation of allowable or trusted hosts or servers are specified with respect to a parent node at level N and a child node at levels N+1 in the tree 200, and that another second variation of allowable or trusted hosts or servers are specified with respect to a parent node at level N+1 and a child node at level N+2 in the tree 200. Thus, the trusted location criteria as described herein may be configurable and may vary with an embodiment.

The number of levels and comparisons made with respect to location information included objects of the hierarchy 200, what is allowable in connection with each such comparison, and the like, as specified in the trusted location criteria may vary with the particular application and use of the techniques herein in an embodiment. For example, the criteria may require that every level in the path from the root (at level 1) to a node (at level N) representing an embedded resource be from the same host or server (where there may be variations regarding what is deemed a same host or server as described elsewhere herein), be from at least the same domain (e.g., have at least the same "domain" such as all from the "GOOD" internet domain) and the like. As another example, the criteria may indicate that for one or more particular resources, such particular resources should not be embedded by any other host other than the host providing each of those particular resources (e.g. matching host or server names 314c in the parent and child nodes as described above), or the criteria may indicate that only a selected set of one or more host or servers may embed a particular resource (e.g., the server or host name of 314c in the parent node identify one of the predefined set of one or more host or server names allowed to embed the particular resource denoted by a child node). As another example, the criteria may require that just the immediate parent of a child node in the hierarchy denote the same host or server name, or some number of ancestor nodes of the child in the tree.

It should be noted that different embodiments may include properties that vary from that as described herein as separate pieces of information extracted from the URL. In such cases, an embodiment may also parse an original or complete URL such as of property 314d to extract the desired portions of the URL of the one or more document objects for use with techniques herein. A resource or document as described herein may generally be any content usable with the browser. A document object may be created for each document, or more generally resource, that is referenced (e.g., loaded, retrieved, interpreted and/or otherwise processed) by a client web browser such as in connection with the example illustrated in FIG. 3.

As described herein a URL, or portions thereof, may be characterized as denoting different variations of a location or source with respect to a resource. For example, the server or host name information of the URL (e.g., as represented by property 314c of element 314) may denote the server or host location providing a resource, or server or host location at which the resource is located (e.g., where the client browser request may be directed). As described herein, the server or host location may be, for example, a FQDN or a corresponding IP address (e.g. web address) for the server as an internet site or website. Additionally, the trusted location criteria may specify varying degrees to which information of different server or host locations need to match in order to allow for embedding a first resource from a first server location within a second resource from a second server location. Furthermore, the trusted location criteria may optionally indicate that additional portions of the URLs of the first and second resources match or otherwise meet specific criteria in order for such embedding to be allowed.

Figure 7:
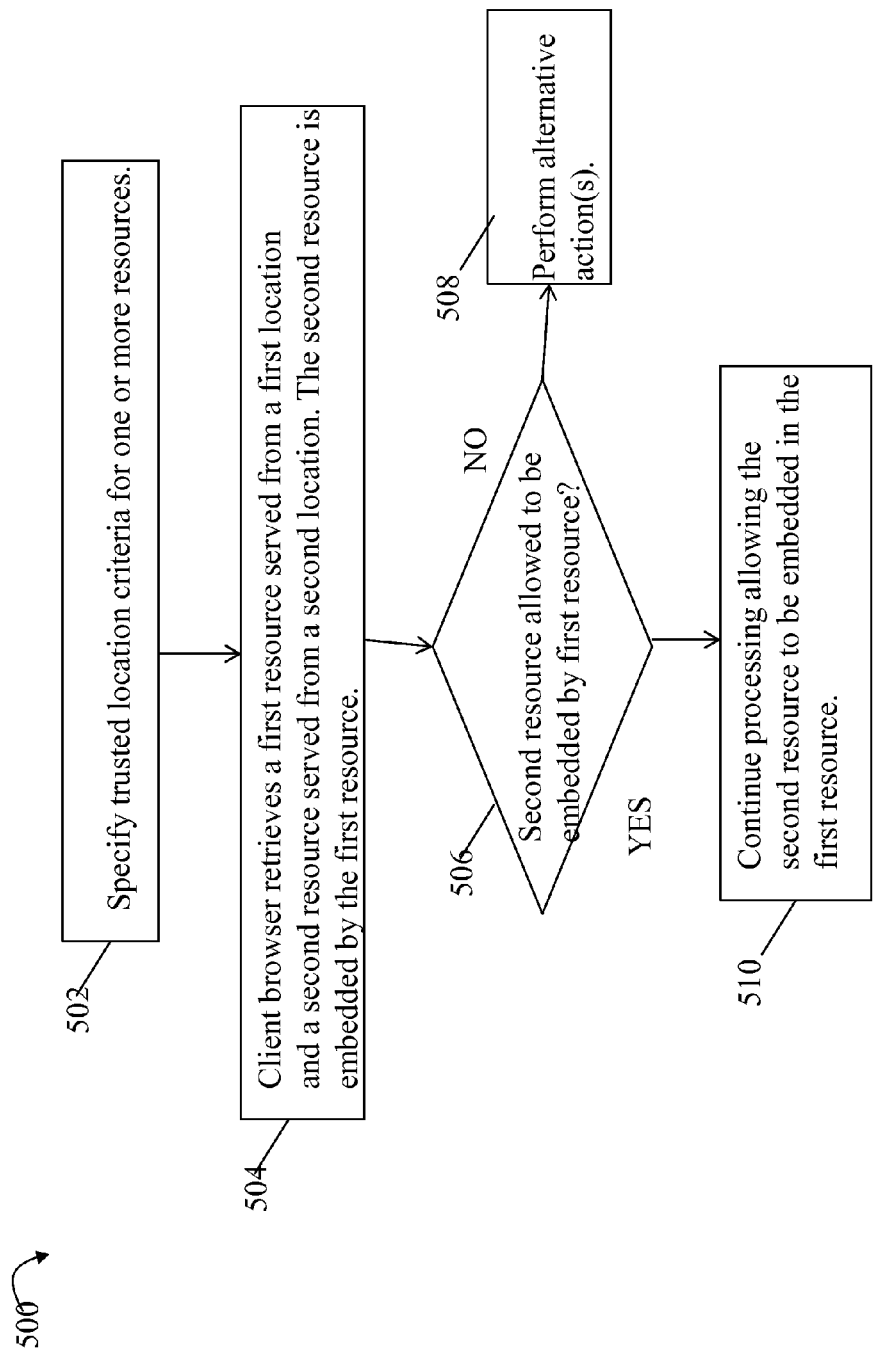
FIG. 7 is an example of a flowchart of processing steps as may be performed in an embodiment in accordance with techniques herein.

Referring to FIG. 7, shown is an example of a flowchart summarizing processing as may be performed in an embodiment in connection with techniques herein. The flowchart 500 summarized processing as described above. In step 502, the trusted location criteria for one or more resources may be specified. At step 504, a client browser retrieves a first resource from a first location and a second resource from a second location. The second resource is embedded by or within the first resource whereby such embedding causes the second resource (that is referenced by the first resource) to be requested and retrieved or loaded for processing from the second location when rendering a webpage. At step 506, a determination is made in accordance with the trusted location criteria as to whether the second resource is allowed to be embedded by the first resource. If step 506 evaluates to no, control proceeds to step 508 to take some alternative action such as, for example, alert the user. If step 508 evaluates to yes, control proceeds to step 510 to continue processing allowing the second resource to be embedded in the first resource thereby allowing the second resource to be automatically loaded, retrieved, or further processed when rendering a webpage.

With reference back to FIG. 3, it should be noted that element 105 denotes the portion of the document B 104 which may include instructions performing the processing as described herein to determine whether a trusted location has embedded document B 104. It should be noted that such instructions may be identified by the document B, directly or indirectly, in any suitable manner. For example, instructions performing such processing may be included directly inline or within document B 104 (e.g., as scripting instructions within document B 104). As another example, document B may further embed or include another resource which includes (directly or indirectly) such instructions to determine whether a trusted location has embedded document B.

In one embodiment, the techniques herein may be used in connection with frames that retrieve or load resources when rendering a webpage for display in a window. For example with reference back to FIG. 3, Evil.com's document A 102 may include HTML statements which follow along the lines of the following template using the iframe tag:

<html>
<body>
<iframe src="https://www.GOOD.com/OK.htm"> </iframe>
:
:
<iframe src="https://www.EVIL.com/REALLYBAD.htm">
</iframe>
:
</body>
</html>
where https://www.GOOD.com/OK.htm may be document B 104 and https://www.EVIL.com/REALLYBAD.htm may be document C 112

As another example using framesets with reference back to FIG. 3, Evil.com's document A 102 may include HTML statements which follow along the lines of the following template using the frameset tag:

```
<HTML>
<FRAMESET cols="50%, 50%">
    <FRAME src="https://www.GOOD.com/OK.htm">
    :
    <FRAME      src="https://www.EVIL.com/REALLY-
        BAD.htm">
</FRAMESET>
</HTML>
``` where https://www.GOOD.com/OK.htm may be document B 104 and
https://www.EVIL.com/REALLYBAD.htm may be document C 112.

The foregoing are examples that may be used in an embodiment in accordance with techniques herein. More generally, the technique herein may be used with any suitable language or element which provides for rendering a webpage in a window which includes embedded resources.

An embodiment may implement the techniques herein using code executed by a processor such as of any suitable computer system or component including such a processor. As will be appreciated by those skilled in the art, the code may be stored on a computer-readable storage medium having any one of a variety of different forms including volatile and nonvolatile, removable and non-removable media implemented in any method or technology for storage of information such as computer readable instructions, data structures, program modules or other data. Computer-readable storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can be accessed by a processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of validating a resource comprising:
   retrieving a first resource that is a first document for a webpage being rendered, said first document embedding a second resource that is a second document automatically retrieved in connection with rendering the webpage, said second document identifying one or more other resources and identifying first instructions that perform validation processing to determine whether the first resource is allowed to embed the second resource and said validation processing allows downloading other content of the one or more other resources subsequent to determining that the first resource is allowed to embed the second resource;
   performing said validation processing by executing said first instructions identified by the second document, said validation processing including:
      determining a first server location providing said first resource, said first server location identifying a first server providing the first resource;
      determining a second server location providing said second resource, said second server location identifying a second server that is a trusted server providing the second resource;
      determining, in accordance with trusted location criteria, whether the first server is trusted by the second server using said first server location and said second server location, wherein said trusted location criteria includes determining the first server is trusted by the second server if the first server matches the trusted server identified by the second server location; and
      if said determining in accordance with trusted location criteria determines that the first server is trusted by the second server, determining that the first resource is allowed to embed the second resource and allowing downloading of other content of the one or more other resources identified by the second resource embedded in the first resource.

2. The method of claim 1, wherein said first server location includes a first fully qualified host name that is either a fully qualified domain name or a first numeric internet address for said first server location, and wherein said second server location includes a second fully qualified host name that is either a second fully qualified domain name or a second numeric internet address for said second server location.

3. The method of claim 1, further comprising receiving a hierarchy of objects including a first object at a first level and a second object at a second level, said first object being a parent of said second object and said second object being a child of the first object, said first object representing the first resource embedding the second resource represented by said second object, each of said objects in the hierarchy identifying a resource automatically retrieved in connection with rendering the webpage, wherein each of the objects included in said hierarchy is a document object including a location object, said location object including a plurality of properties, a first of said properties including a host name, said host name identifying a domain host and a domain name identifying an internet domain providing a resource represented by said each object, said first object including a first instance of said first property identifying a first host name as said first server location and said second object including a second instance of said first property identifying a second host name as said second server location.

4. The method of claim 3, wherein said first server location includes a fully qualified domain name that includes a first domain name and first domain host identified in said first object and said second server location includes a fully qualified domain name that includes a second domain name and second domain host identified in said second object.

5. The method of claim 1, wherein said determining whether said first server is trusted by the second server, wherein the first resource is allowed to embed said second resource, includes comparing at least a portion of said first server location to at least a corresponding portion of said second server location.

6. The method of claim 1, wherein said first server location includes a first fully qualified domain name and said second server location includes a second fully qualified domain name and said determining whether said first server is trusted by the second server, wherein said first resource is allowed to embed said second resource, includes:
   comparing said first fully qualified domain name to said second fully qualified domain name; and determining, based on said comparing, whether at least a portion of said first fully qualified domain name matches at least a corresponding portion of said second fully qualified domain name.

7. The method of claim 6, wherein said trusted location criteria specifies that said first server is trusted by the second server, wherein said first resource is allowed to embed said second resource, if said comparing determines that at least a portion of said first fully qualified domain name matches at least a corresponding portion of said second fully qualified domain name.

8. The method of claim 6, wherein said trusted location criteria specifies that said first server is trusted by the second server, wherein said first resource is allowed to embed said second resource, if said comparing determines that said first fully qualified domain name exactly matches said second fully qualified domain name.

9. The method of claim 8, further comprising receiving a first object that includes a property identifying a first port from which the first resource represented by said first object is provided, and receiving a second object that includes a property identifying a second port from which the second resource represented by said second object is provided.

10. The method of claim 9, wherein said trusted location criteria specifies that said first server is trusted by the second server, wherein said first resource is allowed to embed said second resource, if said first port is the same as the second port.

11. The method of claim 10, wherein said first object includes a property identifying a first protocol used in connection with providing the first resource.

12. The method of claim 11, wherein said trusted location criteria specifies that said first server is trusted by the second server, wherein said first resource is allowed to embed said second resource, if said first protocol is a predetermined secure protocol that performs verification processing including processing to verify an identity of the first server location.

13. The method of claim 1, wherein the second document further embeds any of an application, an image, a document including instructions which are executed, a document including a script, an object including executable code, a multimedia document, a document including at least one of audio data, image data, video data, graphics data and text from the second server location.

14. The method of claim 1, further comprising receiving a hierarchy of objects including a first object at a first level and a second object at a second level, said first object being a parent of said second object and said second object being a child of the first object, said first object representing the first resource embedding the second resource represented by said second object, each of said objects in the hierarchy identifying a resource automatically retrieved in connection with rendering the webpage, and wherein if said validation processing performed by executing said first instructions determines that the first resource is not allowed to embed the second resource, the first instructions include instructions which are executed that alert a user of a web browser and assigning the second object as a root of the hierarchy.

15. The method of claim 1, further comprising receiving a hierarchy of objects including a first object at a first level and a second object at a second level, said first object being a parent of said second object and said second object being a child of the first object, said first object representing the first resource embedding the second resource represented by said second object, each of said objects in the hierarchy identifying a resource automatically retrieved in connection with rendering the webpage, wherein the first object is not a root of the hierarchy and is included in a path from the root of the hierarchy to a second node, and the method includes examining one or more objects which are included in the path and which are ancestors of the first object, and determining whether each of one or more server locations identified by said one or more objects is a trusted location in accordance with said trusted location criteria.

16. The method of claim 1, wherein said first instructions are included inline in said second document or are included in another resource that is any of automatically retrieved, loaded and processed in connection with processing said second document when rendering said webpage in a window.

17. A non-transitory computer readable medium comprising code stored thereon for validating a resource, wherein said code, when executed, performs processing comprising:
retrieving a first resource that is a first document for a webpage being rendered, said first document embedding a second resource that is a second document automatically retrieved in connection with rendering the webpage, said second document identifying one or more other resources and identifying first instructions that perform validation processing to determine whether the first resource is allowed to embed the second resource and said validation processing allows downloading other content of the one or more other resources subsequent to determining that the first resource is allowed to embed the second resource;
performing said validation processing by executing said first instructions identified by the second document, said validation processing including:
determining a first server location providing said first resource, said first server location identifying a first server providing the first resource;
determining a second server location providing said second resource, said second server location identifying a second server that is a trusted server providing the second resource;
determining, in accordance with trusted location criteria, whether the first server is trusted by the second server using said first server location and said second server location, wherein said trusted location criteria includes determining the first server is trusted by the second server if the first server matches the trusted server identified by the second server location; and
if said determining in accordance with trusted location criteria determines that the first server is trusted by the second server, determining that the first resource is allowed to embed the second resource and allowing downloading of other content of the one or more other resources identified by the second resource embedded in the first resource.

18. The non-transitory computer readable medium of claim 17, wherein said first server location includes a first fully qualified host name, that is either a fully qualified domain name or a first numeric internet address for said first server location, and wherein said second server location includes a second fully qualified host name that is either a second fully qualified domain name or a second numeric internet address for said second server location.

19. A system comprising:
a processor that executes code performing first processing for validating a resource; and
a memory comprising code stored therein which, when executed, performs said first processing including:
retrieving a first resource that is a first document for a webpage being rendered, said first document embedding a second resource that is a second document automatically retrieved in connection with rendering the webpage, said second document identifying one or more other resources and identifying first instructions that perform validation processing to determine whether the first resource is allowed to embed the second resource and said validation processing allows downloading other content of the one or more other resources subsequent to determining that the first resource is allowed to embed the second resource;

performing said validation processing by executing said first instructions identified by the second document, said validation processing including:

determining a first server location providing said first resource, said first server location identifying a first server providing the first resource;

determining a second server location providing said second resource, said second server location identifying a second server that is a trusted server providing the second resource;

determining, in accordance with trusted location criteria, whether the first server is trusted by the second server using said first server location and said second server location, wherein said trusted location criteria includes determining the first server is trusted by the second server if the first server matches the trusted server identified by the second server location; and if said determining in accordance with trusted location criteria determines that the first server is trusted by the second server, determining that the first resource is allowed to embed the second resource and allowing downloading of other content of the one or more other resources identified by the second resource embedded in the first resource.

\* \* \* \* \*